Oct. 10, 1933.   J. KELLNER   1,929,892
CARRIAGE WINDOW
Filed Sept. 22, 1932
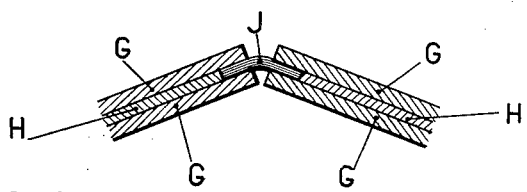
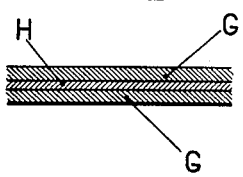
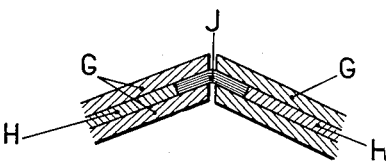
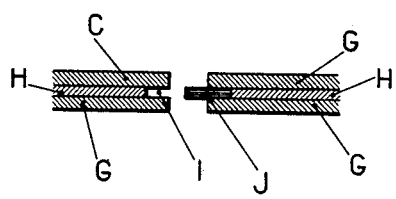
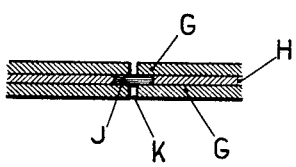
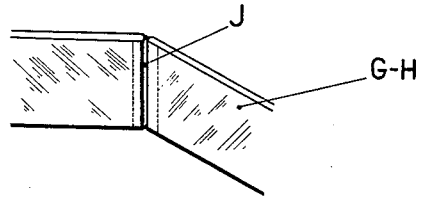
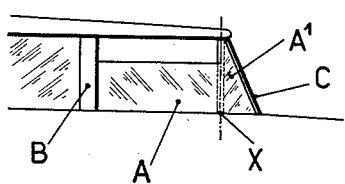
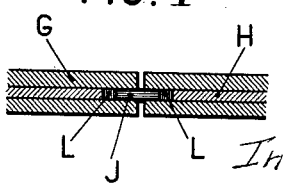
Inventor
Jacques Kellner
By E. F. Wenderoth,
Atty Patented Oct. 10, 1933

1,929,892

UNITED STATES PATENT OFFICE 1,929,892

CARRIAGE WINDOW

Jacques Kellner, Paris, France, assignor to Société à Responsabilité limitée Jacques Kellner, Paris, France Application September 22, 1932
Serial No. 634,435

1 Claim. (Cl. 296—44)

The object of the present invention is an improvement in glass carriage windows permitting of their movement one with regard to the other when juxtaposed along their edges without the necessity of inserting a separating device between them.

The invention makes it possible to carry out the satisfactory fitting of glass windows according to the various forms of installation while suppressing the separating channel pieces which interfere with visibility and do not produce a pleasing aspect, when said windows are in the same plane or when they form a dihedral angle.

The essential features of one form of my invention are illustrated by way of example, in the accompanying drawing, wherein Fig. 1 is a section through a composite glass such as I employ;

Fig. 2 shows such glass provided with a form of joint according to my invention;

Fig. 3 is a view similar to Fig. 2 but with the joint securing the adjacent glass panes together;

Fig. 4 is a modification showing the use of a friction absorbing substance;

Fig. 5 is an elevation showing two glasses according to my invention in operable relation to each other;

Figs. 6 and 8 show in section two forms of angular joints; while

Fig. 7 is a perspective view of an angular joint according to Fig. 6.

The present invention makes it possible to adopt this arrangement of two panes, one fixed and triangular and the other rectangular and movable, but without the presence of any separating channel piece.

For this purpose the present invention makes use of that kind of glass which is now in common use, especially in coachwork and which offers the advantage of not splintering in case of shocks or breakage.

This kind of glass, as is generally known, is made up of two sheets of glass between which is inserted a plate of a transparent plastic substance set up as a solid whole. Figure 1 shows a section of a composite pane of this sort, the two plates of glass being indicated by G, G and the intermediary plate, made of a plastic substance, being indicated by H.

According to the invention, in order to make two panes which are capable of moving, one with respect to the other, in the same plane without the insertion of a separating channel piece, from the composite panes aforementioned, the following procedure is adopted: the two panes having been cut to the desired dimensions, a portion of the intermediary plastic substance H is removed from each of them at I along the edges which are intended to be juxtaposed. This operation can be effected with a milling cutter or with a tool or by any other suitable means. The appearance of the panes, in section, is then as shown in Figure 2 with a slot I. In the slot of one of these panes a band J, sufficiently rigid and made of celluloid or of a similar substance, is fixed by gluing or by any other suitable means, such band J being of such a width as to fill slot I and to extend beyond by a width corresponding with the depth of slot I of the other pane; the two panes are then butt-jointed as shown in Figure 3, thus corresponding to the carpentering assembly known as "scarf and tongue". Care is taken to leave a small interval K to prevent the two panes of glass rubbing one against the other; it is also possible to avoid the rubbing of blade J at the bottom of slot I against the layer of plastic substance by positioning a band L of a suitable substance at the bottom of said slot to take the friction of blade J as shown in Figure 4.

As blade J is fixed in slot I of one of the panes and free in the other it is possible to make one of the panes slide with respect to the other, pane A in the example considered, in respect of fixed pane $A^1$, without the necessity for a separating channel piece; the assembly of the two panes A and $A^1$ therefore presents itself without the opaque band which would be caused by such a channel piece and visibility is not interfered with over the whole extent of the surface of the two panes A and $A^1$.

Figure 5 is a representation of two such panes placed edge to edge in this manner; dotted lines X indicate the line of connection and the width of the celluloid band inserted into the slots of either pane.

Figure 6 in the attached drawing is a representation of two composite panes forming an angle with one another, shown in section; Figure 7 is a view in perspective of said two panes and it is evident that the panes can be given a bevelled edge, as shown in Figure 8 in order to avoid the constitution of an angular space at the junction such as occurs in the arrangement shown in Figure 6 in which the panes are cut at right angles.

While the embodiment of the invention has been described hereinabove in a particular application on a trapezoidal surface comprising a fixed triangular pane and a rectangular movable pane it is to be understood that the invention is not so limited but may likewise be applied in all cases where it is desired to provide two panes of glass capable of displacement one with regard to the other without the insertion of a channel piece or of a fixed part separating them.

Although in the foregoing description the use of composite glass panes such as are obtainable in the trade has been considered, said panes being then submitted to manipulations for the purpose of removing a portion of the plastic substance in order to form a groove, it is to be understood that the invention is not so limited and that it applies also to such composite glass panes in which the slot might be provided at time of manufacture.

What I claim is:

A carriage window, comprising a pair of composite panes slidable with respect to each other and disposed in different planes forming between them a dihedral angle, each pane being formed by sheets of glass bound together by an intermediate layer of plastic substance, said layer terminating short of the edges of the said sheets, thereby forming a slot along said edges, and a band inserted in said slot, the extremity of said band protruding externally and adapting itself to the corresponding slot of the adjacent pane, whereby the panes are rendered slidable relative to each other.

JACQUES KELLNER.